US010191836B2

(12) United States Patent
Dracea et al.

(10) Patent No.: US 10,191,836 B2
(45) Date of Patent: Jan. 29, 2019

(54) SOFTWARE WATCHPOINTS APPARATUS FOR VARIABLES STORED IN REGISTERS

(71) Applicant: NXP USA, Inc., Austin, TX (US)

(72) Inventors: Alexandra Dracea, Comarnic (RO); Catalina D. Mitulescu, Bucharest (RO); Daniel D. Popa, Bucharest (RO)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/447,642

(22) Filed: Mar. 2, 2017

(65) Prior Publication Data
US 2018/0181480 A1    Jun. 28, 2018

(30) Foreign Application Priority Data
Dec. 28, 2016   (RO) ................................ A201601049

(51) Int. Cl.
*G06F 9/44*     (2018.01)
*G06F 11/36*    (2006.01)

(52) U.S. Cl.
CPC ........ *G06F 11/364* (2013.01); *G06F 11/3612* (2013.01)

(58) Field of Classification Search
CPC ........................... G06F 11/364; G06F 11/3612
USPC ....................................................... 717/129
See application file for complete search history.

(56) References Cited

U.S. PATENT DOCUMENTS

| | | | | |
|---|---|---|---|---|
| 5,907,709 A | * | 5/1999 | Cantey ................. | G06F 11/366 714/E11.211 |
| 6,434,741 B1 | * | 8/2002 | Mirani ................ | G06F 11/3628 714/E11.209 |
| 6,438,745 B1 | * | 8/2002 | Kanamaru .......... | G06F 9/44521 717/137 |
| 7,137,105 B2 | * | 11/2006 | Madsen .............. | G06F 11/3466 717/128 |
| 7,711,914 B2 | | 5/2010 | Thelen et al. | |
| 8,352,714 B2 | | 1/2013 | Dosh et al. | |
| 9,720,925 B1 | * | 8/2017 | Lawson ................ | G06F 17/301 |
| 2005/0210275 A1 | * | 9/2005 | Homing ................. | G06F 21/14 713/190 |
| 2008/0127107 A1 | * | 5/2008 | Kosche ............... | G06F 11/3447 717/128 |
| 2008/0127113 A1 | | 5/2008 | Wu et al. | |
| 2008/0244533 A1 | * | 10/2008 | Berg .................... | G06F 11/3447 717/128 |
| 2009/0217095 A1 | | 8/2009 | Bussa et al. | |
| 2009/0217248 A1 | * | 8/2009 | Bently ..................... | G06F 8/30 717/132 |
| 2009/0235059 A1 | | 9/2009 | Moyer et al. | |
| 2009/0265582 A1 | | 10/2009 | Udupa et al. | |
| 2010/0306746 A1 | * | 12/2010 | Barua ....................... | G06F 8/52 717/136 |
| 2011/0258616 A1 | * | 10/2011 | Sollich ..................... | G06F 9/44 717/146 |

(Continued)

*Primary Examiner* — Chameli Das

(57) ABSTRACT

A method, system, and apparatus are provided for debugging a compiled computer program having one or more variables by generating variable location information for a first variable stored in a CPU register that is parsed from runtime disassembly information for the compiled computer program and used to generate a pattern to search for the first variable in the runtime disassembly information to identify a program address for the first variable that can be used to set a software program watchpoint for the first variable.

16 Claims, 6 Drawing Sheets

(56) References Cited

U.S. PATENT DOCUMENTS

| | | | |
|---|---|---|---|
| 2013/0047037 A1 | 2/2013 | Moyer | |
| 2013/0117853 A1* | 5/2013 | Tsviatkou | G06F 21/563 |
| | | | 726/23 |
| 2014/0282586 A1* | 9/2014 | Shear | G06F 9/5072 |
| | | | 718/104 |
| 2016/0147517 A1* | 5/2016 | Vicovan | G06F 11/3636 |
| | | | 717/140 |
| 2016/0299859 A1 | 10/2016 | Popa et al. | |
| 2017/0068610 A1* | 3/2017 | Gschwind | G06F 11/3664 |

* cited by examiner

SOFTWARE WATCHPOINTS APPARATUS FOR VARIABLES STORED IN REGISTERS

BACKGROUND OF THE INVENTION

Field of the Invention

The present invention is directed in general to field of information processing. In one aspect, the present invention relates generally to a method and apparatus for debugging computer programs in a data processing system.

Description of the Related Art

Computer program debuggers are commonly used during software development to find and resolve defects that prevent correct operation of computer software or a system. However, debugging operations can be tedious and time-consuming, in part because the program code responsible for a bug can be difficult to find since a serious software bug may be caused by a single instruction among millions of instructions in a computer program. To assist with program debug operations, a data breakpoint or watchpoint can be inserted into a predetermined memory location in the program to provide information about the program's execution. When the program accesses the predetermined memory location specified by the watchpoint, the debugger halts or interrupts execution of the program, allowing the programmer to inspect the test environment (general purpose registers, memory, logs, files, etc.) to find out whether the program is functioning as expected. There are many different types of watchpoints, including watchpoint references to the value of a single variable or to an address cast to an appropriate data type (e.g., *(int*) 0x1234 will watch a 2-byte region at the specified address). In addition, a watchpoint could include an arbitrarily complex expression (e.g., a*b+c) or an expression, even if the expression cannot be evaluated yet, such as by setting a watchpoint on *global_ptr before it is initialized. Whatever watchpoint variable or expression is specified in the program code, its functionality can effectively be eliminated during compiler optimization of the program code which can move the variable/expression from memory and into a CPU register which requires dedicated hardware support for tracking access to the CPU register. An additional limitation that arises from compiler optimizations which move variable to CPU registers is the limited number of CPU register resources which constrain the number of watchpoints that can be used. These limitations can make the application debugging very difficult for the users and also constraining the number of watchpoints that can be installed due to hardware limitations on the number of watchpoint registers. As seen from the foregoing, the existing debugging solutions for monitoring watchpoints are extremely difficult at a practical level by virtue of the difficulty in using watchpoints for variables or expressions that have been moved into CPU registers by compiler optimization processes, especially where there are limited hardware comparator or watchpoint register resources available at the CPU.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

A system, apparatus, and methodology are described for efficiently setting software watchpoints using standard debug and disassembly information so that variables and/or expressions stored in registers can be debugged with a debugger without requiring dedicated watchpoint hardware or special compiler software for generating information about the program variables/expressions. In selected embodiments, software watchpoints for debugging a computer program are generated at the computer host side of a software debugging tool which uses standard compiler-generated debug and disassembly information to determine a location (e.g., memory or register) for a user-specified variable to be tracked, to create a corresponding regular expression, search address range, and variable type for searching disassembly information, and to insert a corresponding software breakpoint at a specified PC machine address based on the results of the pattern search. Using only standardized debug information (e.g., DWARF) along with runtime disassembly information that are generated after the program compilation phase, access location information for the variable(s) in the program is generated for use by a software breakpoint virtual machine which installs one or more software watchpoints for user-specified program variables according to the access location information for the program variable. In this way, software watchpoints for variables that are stored in registers can be set during runtime using dedicated debugger support so that no other software or hardware components are needed. In the disclosed system, apparatus, and methodology, the debug tool may be configured to use only standard Extensible Linking Format (ELF) debug information to install software watchpoints for variables that are stored in CPU registers or in internal memory with a two-stage process that does not require hardware support or specialized debug information. In the first stage, the scope of the user-specified variable is detected based on standard debug information for checking where the variable/expression is located. In the second stage, the register operation is identified based on the runtime disassembly information to identify a read/write operation and set software breakpoints to stop the execution. In disclosing the claimed apparatus, system, and method for installing software watchpoints by using specific rules, rather than humans, to retrieve debug information for a user-specified variable, to parse standard runtime disassembly information, to perform a pattern search in the runtime disassembly information for identifying where a user-specified variable is stored, and then to install a software watchpoint at the program counter address(es) where the pattern is found, there is disclosed an improvement in computer-related technology that previously could only be produced by humans, if at all.

Figure 1:
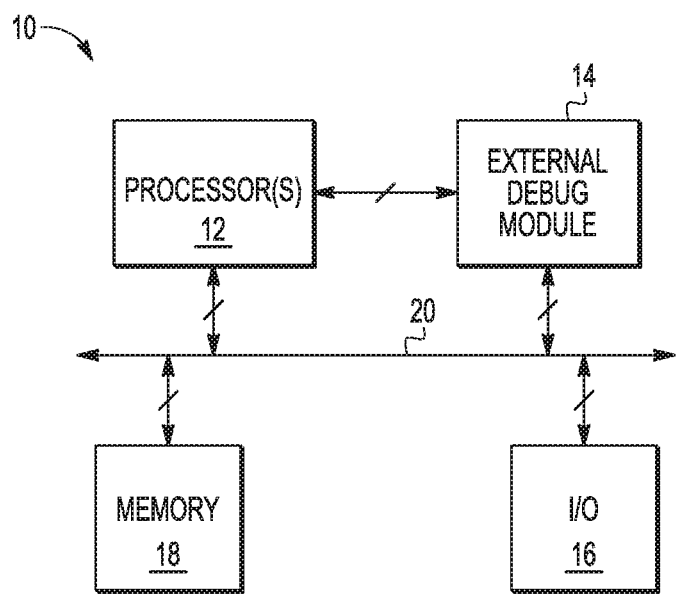
FIG. 1 is a simplified block diagram of a data processing system in accordance with selected embodiments of the present disclosure.

To provide a contextual understanding for selected embodiments of the present disclosure, reference is now made to FIG. 1 which shows a simplified block diagram of a data processing system 10 in accordance with selected embodiments of the present disclosure. In general, data processing system 10 may be implemented on a single integrated circuit or on a plurality of integrated circuits. In some cases, data processing system 10 may be implemented as a system-on-chip. In the illustrated configuration, data processing system 10 includes one or more processors 12, external debug module 14 which may reside on the computer host side in a software debugging tool, I/O module 16, and memory 18. Components of data processing system 10 are interconnected and interoperate using any suitable techniques. For simplicity, a bus 20 provides an interconnection mechanism between major functional blocks 12, 14, 16, 18, although persons of ordinary skill in the art will recognize that any of a variety of interconnection techniques and topologies may be employed without departing from the present invention.

In selected embodiments, the processor(s) 12 may include fetch buffers or other facilities for storing instructions to be executed by the processor(s), decoder and sequencing logic, one or more execution units, and register storage, together with suitable data, instruction and control paths. At any given time, consistent with a computation performed by processor(s) 12, units of program code (e.g., instructions) and data from memory 18 are stored in one or more cache levels and/or in processor stores (such as a fetch buffer, registers, etc.). In general, any of a variety of memory hierarchies may be employed, including designs that separate or commingle instructions and data in memory or cache. Memory 18 (or any portion thereof) may be located on the same integrated circuit as a processor, may be located on a different integrated circuit than processor(s) 12, and/or may span multiple integrated circuits. In addition, memory 18 may include storage of any suitable type, such as, for example, read only memory (ROM), random access memory (RAM), nonvolatile memory (e.g., Flash), etc. External debug module 14 may be implemented as a separate system independent of any integrated circuits or system-on-chip containing processor(s) 12, or may be contained on the same integrated circuit as a processor. The program code implementing the software watchpoint installation mechanism disclosed herein may reside on the computer host side in the software debugging tool which may be connected to access the processor resources (e.g., the internal memory of the processor 12) when setting the software breakpoint(s) through a JTAG connection debug port.

Figure 2:
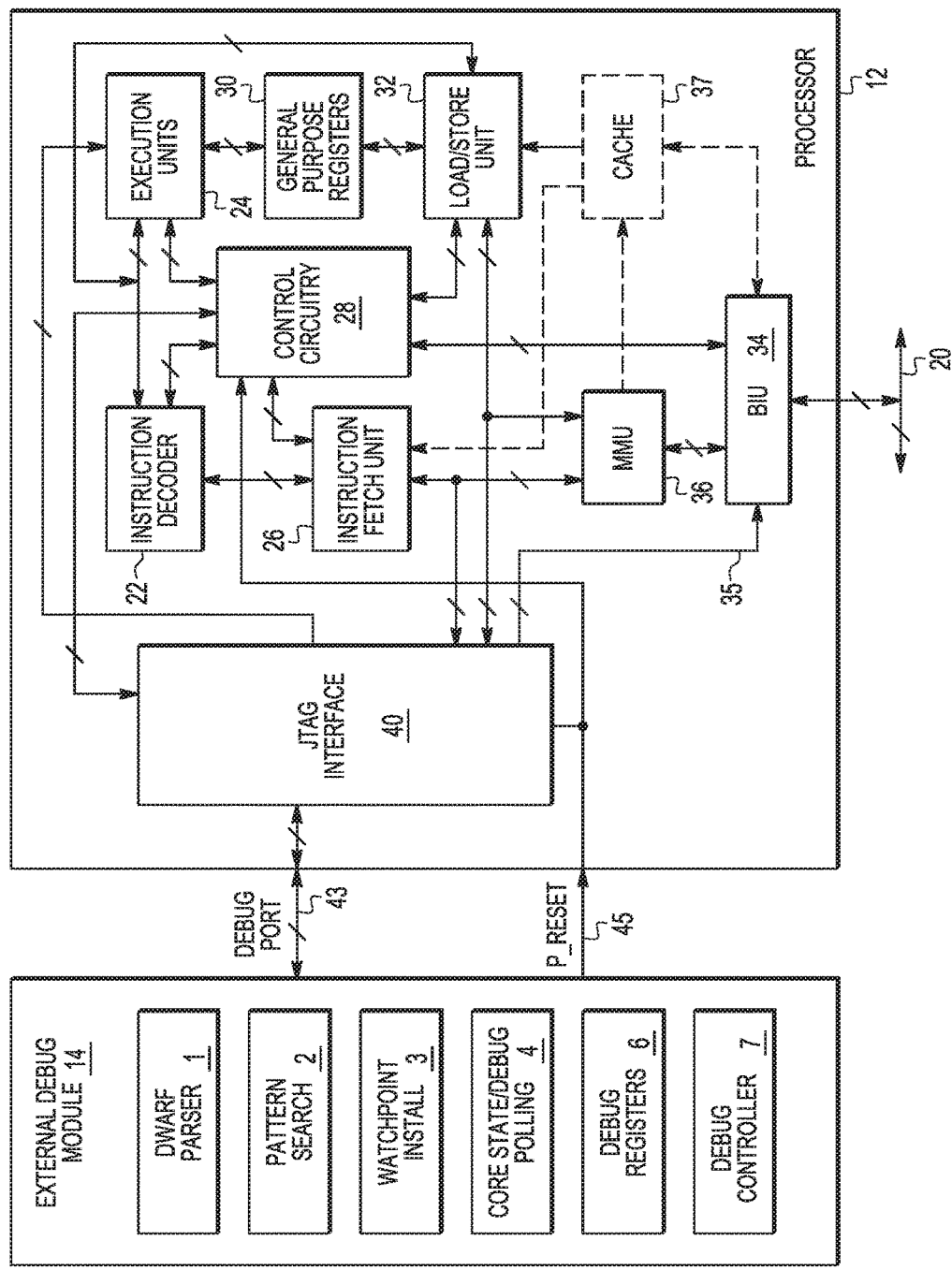
FIG. 2 is a simplified block diagram of a processor in accordance with selected embodiments of the present disclosure.

Referring now to FIG. 2, there is shown a simplified block diagram of a processor instance corresponding to the processor(s) 12 of data processing system 10 shown in FIG. 1, now referred to as processor 12. In the depicted processor architecture, the processor 12 includes an instruction decoder 22, one or more execution units 24, instruction fetch unit(s) 26, control circuitry 28, general purpose registers 30, load/store unit 32, bus interface unit (BIU) 34, and JTAG interface circuitry 40. The processor 12 may also include an optional cache 37 which may be provided as an integrated data/instruction cache (e.g., on-chip) together with processor 12 in some embodiments, although persons of ordinary skill in the art will recognize that separate data and instruction portions may be provided, if desired, and some embodiments may co-locate only a data-portion or only an instruction-portion together with processor 12. In addition, a memory management unit (MMU) 36 may coordinate address translations for accessing the memory 18 and/or cache memory 37. In addition, the processor 12 may use the BIU 34 to communicate with other components of a data processing system 10 which may include memory (potentially including cache(s)), I/O components, and/or external debug circuitry, and may also use the JTAG interface 40 to communicate with the software debugging tool.

In operation, the debug module 14 monitors activity within the processor 12 and/or memory 18 by using the debug controller 7 to detect one or more predetermined conditions based on stored debug configuration information present within debug registers 6 and to generate therefrom one or more data breakpoint events, instruction breakpoint events, instruction execution events (such as a branch or trap taken event), an instruction completion event or the like. When connected externally, the debug module 14 may be included as part of a suitable debug tool, such as an IEEE ISTO-5001 compliant Nexus™ debugging unit which is connected to the processor(s) 12 through a debug port 43 or other suitable interface to a JTAG interface 40, or through a parallel port, a combination of serial and parallel ports, or as an Ethernet port. Debug registers 6 typically include bits grouped in fields for controlling various debug related events, including instruction breakpoints, data breakpoints, watchpoints, and other messaging associated with debugging. Generally, these debugging resources may be shared between processor(s) 12 and external debug module 14, and may be employed to establish predicate states (such as memory page attributes, marked segments or regions, and/or combinations of address-identifiers) that selectively enable (or disable) the debug controls described herein.

For example, the debug registers 6 may provide storage for one or more address comparison values, address ranges, and data match values that may be useful for implementing instruction and/or data access breakpoint and watchpoint events, and other debug control criteria. These address and data values, along with various control criteria, are used to determine when the processor 12 accesses one or more predetermined instruction addresses or data addresses for the purpose of generating a breakpoint or watchpoint event, which can cause the processor 12 to begin exception processing for a debug exception when internal debug mode is active, or cause the processor 12 to enter a debug halted mode in which it responds to commands provided by external debug module 14 through the debug port 43. By way of example and not limitation, debug registers 6 may include debug control registers suitable for storage of debug configuration information, instruction address compare registers and data address compare registers, as well as debug status registers, debug counters and data value compare registers. In general, debug registers 6 may be a visible part of the user's software programming model. Debug counters may be configured to count-down when one or more count-enabled events occur. When a count value reaches zero, a debug count event may be signaled and a debug interrupt may be generated, if enabled. Data value compare registers may store data values for data comparison purposes, such as in the implementation of conditional breakpoints.

By way of example, and not limitation, the external debug module 14 may be embodied with a set of instructions and/or program code which is executed to install software watchpoints, where the program code instructions are embodied in a first parsing module 1 which collects predetermined information for a user-specified variable from standard debug information, such as variable scope (e.g., local or global), variable location (e.g., register or memory), and variable type (e.g., read or write). In operation, the debugger may use the first parsing module 1 to identify the scope of the variable as being either global or local based on the standard debug information associated with the selected variable. An example debug data format is the DWARF formatted debug format whose name is variously attributed to a medieval fantasy complement to "elf" or the acronym "Debugging With Attributed Record Formats," though there is no official meaning for the DWARF term.

In the debug module 14, the program code instructions may also include a second pattern search module 2 which searches the disassembly information over a specified address range for information identifying the user-specified variable. Depending on whether the first parsing module 1 determines that the variable is a local or global variable, the search address range used by the pattern search module 2 can be a limited machine address range (in the case of a local variable) or can be an iterative sequence of machine address ranges (in the case of a global variable) so that the debugger can extend the search area in the runtime disassembly. In selected embodiments, the pattern search module 2 may use a string expression, machine address range, and type of variable search over the machine address range for the user-specified variable to generate a PC machine address and marker flag. Having the prologue and epilogue machine addresses of the function scope, the pattern search module 2 may be configured to start looking for variable references in the disassembly range of the function. If the parsed DWARF data indicates that the variable is stored in a register, then the search string expression will be a regular expression containing the register name and the type of operation (e.g., read or write) that is associated with the watchpoint. If the parsed DWARF data indicates that the variable is stored in memory (and not stored in a register), then the search string expression will contain memory address references (e.g., Frame Pointer+/-offset of var x) instead of register name.

The debug module 14 may also include the program code instructions which embody a third watchpoint installation module 3 which uses runtime disassembly information to identify read/write operation and insert software breakpoints at the program counter addresses where the pattern search module located the regular expression was found in the disassembly information. If no regular expression was found by the pattern search module 2, the watchpoint installation module 3 will not insert any software breakpoint, and the algorithm is finished.

Once the software watchpoints are installed, the debug module 14 may employ additional program code instructions embodied in a fourth polling module 4 which is configured to poll the core state and to process address debug events. In selected embodiments, the polling module 4 checks the state of the processor core at predetermined polling or time intervals to expose the user to an accurate picture of the application and processor state. Upon determining that the core is suspended, the polling module 4 determines the root cause of the core suspension (e.g., the core hits an installed software breakpoint or some other debug event). If an installed software breakpoint does not have a marker flag set, the polling module 4 provides a user notification that the watchpoint was hit by providing the user with information (e.g., register values, memory content, the event responsible for the core to stop) and installs the software watchpoint. However, if the installed software breakpoint does have a marker flag set, the polling module 4 installs a software watchpoint and resumes core execution.

When the user is setting the watchpoint on a variable x from an user interface Integrated Development Environment or from an command line debugger the first step is to collect the necessary information about this variable: variable scope, location, type. This is done by the debugger using the debug information, represented in DWARF standard. This standard provides information about a variable: where is located—if is declared at global level available to entire program or local, visible only in a function; the location of the variable that can be register name, machine address, offset relative to the frame pointer. Also the debugger can get an addresses range for the variable lifespan: if local then the address range is the function start and end address, if global then the address range is the current program counter value and the end of main function.

Figure 3:
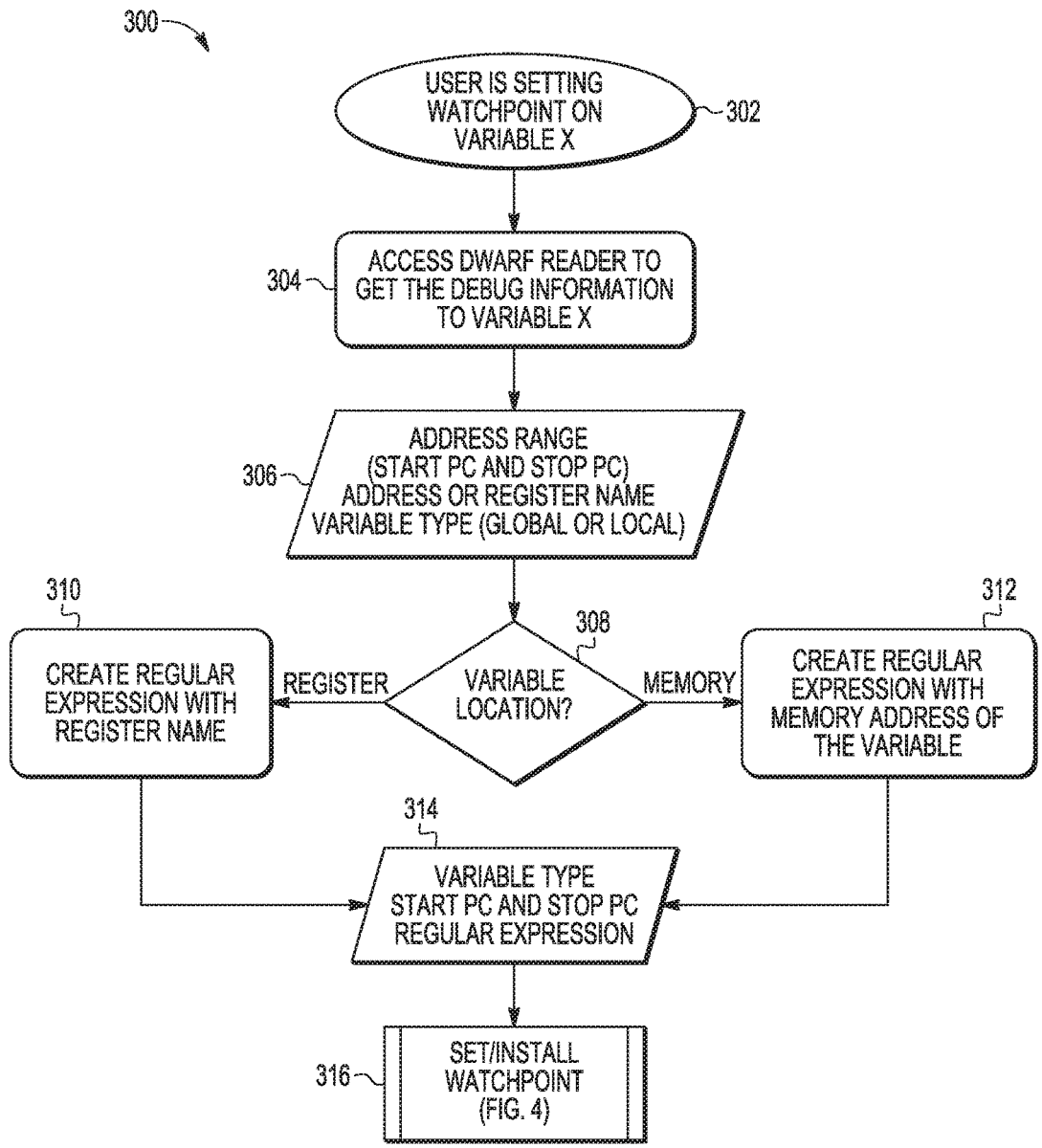
FIG. 3 illustrates a simplified flow chart showing the logic for setting watchpoints in accordance selected embodiments of the present disclosure.

To provide additional details for an improved understanding of selected embodiments of the present disclosure, reference is now made to FIG. 3 which depicts a simplified flow chart 300 showing the logic for setting watchpoints in accordance selected embodiments of the present disclosure. In an example embodiment, the processing shown in FIG. 3 may be performed by a software debugging tool that is installed on a host computing system that is external to the processor resources, such as the processor and the memory where the computer software being debugged is stored.

At step 302, the user sets the watchpoint for a user-specified variable (e.g., "variable x"). In an example embodiment, the user may use the debug tool to set the watchpoint on a variable x, such as by using a user interface for an Integrated Development Environment (IDE) tool, such as Eclipse, or from a command line debugger. In other embodiments, a GNU Debugger provides an option for the user to set watchpoints from command line (e.g., watch <variable_name>).

Once the variable is selected, predetermined debug information for the variable is retrieved or accessed from the executable (ELF) file information at step 304. In selected example embodiments, the predetermined debug information is retrieved by accessing debug information from a standardized debugging information format, such as DWARF. As will be appreciated, the DWARF standard is widely used by most compiler and debuggers in order to achieve source level debugging and to expose information to the user, such as variable data (e.g., which variables are included in an application, along with information about variable location, lifespan, and type (e.g., integer, vector, struct) and/or program function data (e.g., the name of the program functions, their location in the memory (e.g., the start and end address in memory), etc.). To retrieve the predetermined debug information, the processing at step 304 may use a utility (e.g., objdump) from the compiler package or an ELF reader (e.g., readelf) that can return the variable information from the debug information. An example of the output generated by the ELF reader utility is set forth below:

| [addr] | [instruction bits] | [the instruction in human readable format] |
|---|---|---|
| 80000a14: | d503205f | wfe |
| 80000a18: | 885ffc01 | ldaxr w1, [x0] |
| 80000a1c: | 35ffffc1 | cbnz w1, 80000a14 <loop> |
| 80000a20: | 52800021 | mov w1, #0x1 // #1 |
| 80000a24: | 8802fc01 | stlxr w2, w1, [x0] |
| 80000a28: | 35ffff62 | cbnz w2, 80000a14 <loop> |
| 80000a2c: | d65f03c0 | ret |

Upon accessing the debug information, the debugger collects predetermined information (block 306) about the user-specified variable, such as variable scope, location, and type information. In selected example embodiments, the debug information represented in DWARF standard provides information about a variable type (e.g., global or local), where a "global" variable type is available to the entire program, and a "local" variable type is visible only in a function or limited portion of the program. In addition, the debug information represented in DWARF standard provides information about a variable to specify the location of the variable that can be register name or address, such as a machine address or offset relative to a frame pointer. Also the debugger can get an address range for the variable lifespan or type so that a local variable address range is defined with a start and end address, while a global variable address range is defined with reference to the current program counter value and the end of main function.

With the variable location information retrieved from debug information (block 306), the debugger can build a regular expression that will be used in a search for variable references. For example, if the debugger determines that the variable is stored in a register (e.g., "register" outcome from detection step 308), then the debugger constructs a search string at step 310 as a regular expression containing the register name and the type of operation (e.g., read or write) associated with the user-specified watchpoint. However, if the debugger determines that the variable is stored in memory (e.g., "memory" outcome from detection step 308), then the debugger constructs a search string at step 312 as a regular expression containing the machine address or memory address of the variable and the type of operation (e.g., read or write) associated with the user-specified watchpoint. In the case of a local variable where the location is an offset relative to a function frame pointer, then the debugger constructs the search string at step 312 as a regular expression which contains an offset string (e.g., "Frame Pointer register name+/−offset of var x") and the type of operation (e.g., read or write) associated with the watchpoint.

With the assembled regular expressions created at step 310 and 312, the debugger has constructed a pattern search input term (block 314) which includes variable type, machine address range, and a regular or string expression for the user-specified variable. The pattern search input term is processed to set or install a watchpoint (step 316), such as by inserting a software breakpoint at the program counter addresses where the pattern was found.

Figure 4:
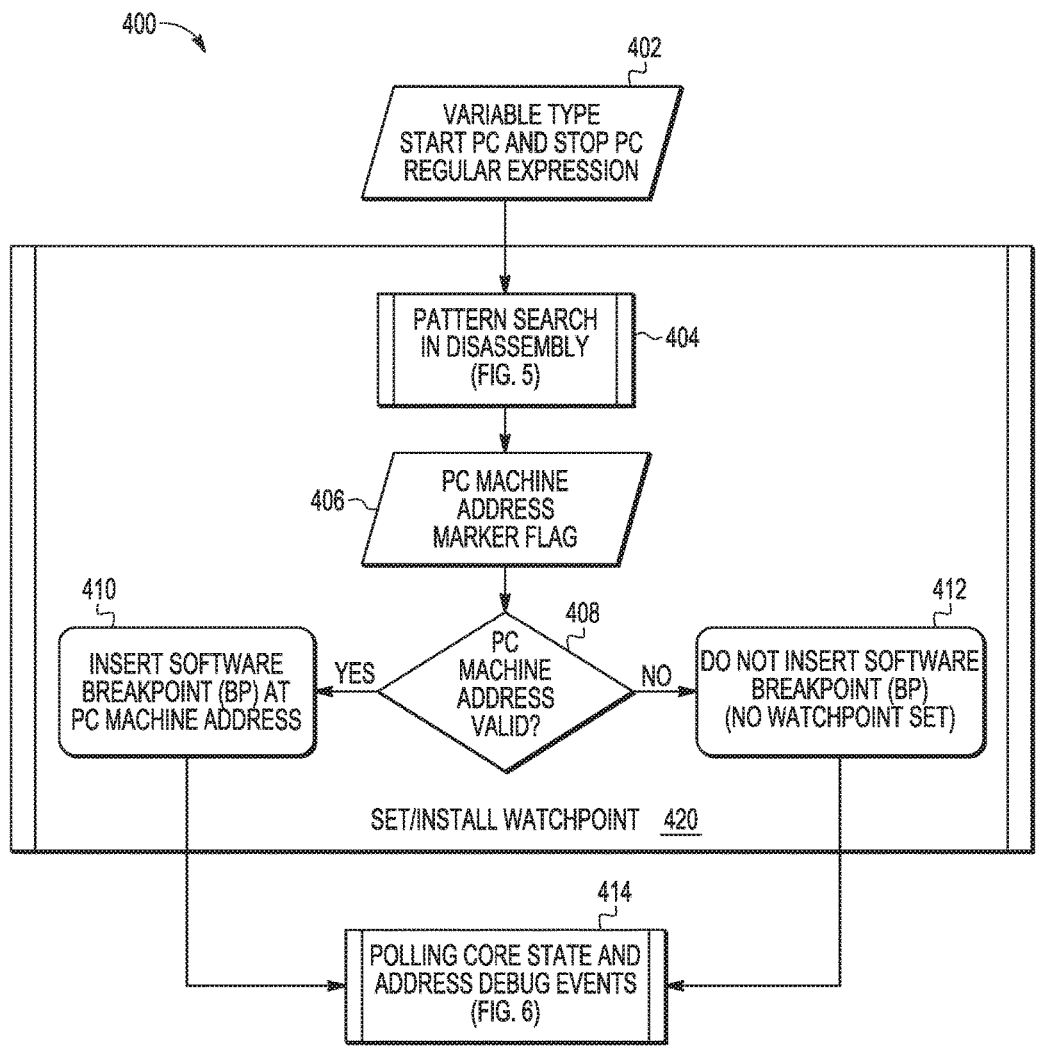
FIG. 4 illustrates a simplified flow chart showing the logic for installing a watchpoint in accordance selected embodiments of the present disclosure.

To provide additional details for an improved understanding of selected embodiments of the watchpoint installation step 316, reference is now made to FIG. 4 which depicts a simplified flow chart 400 showing the logic for installing a watchpoint (step 420) in accordance selected embodiments of the present disclosure. In an example embodiment, the processing shown in FIG. 4 may be performed by a software debugging tool that is installed on a host computing system that is external to the processor resources, such as the processor and the memory for storing the computer software being debugged.

As seen in FIG. 3, the input data for the watchpoint installation step 420 is generated as pattern search input term (block 402) composed of a regular string expression, machine address range (e.g., start PC and stop PC addresses), and variable type (e.g., local or global) corresponding to the user-specified or selected variable. With this information, the debugger performs a pattern search (step 404) in the runtime disassembly information between the specified machine address range to return a machine address and a marker flag (block 406) for any variable references detected in the runtime disassembly information.

Figure 5:
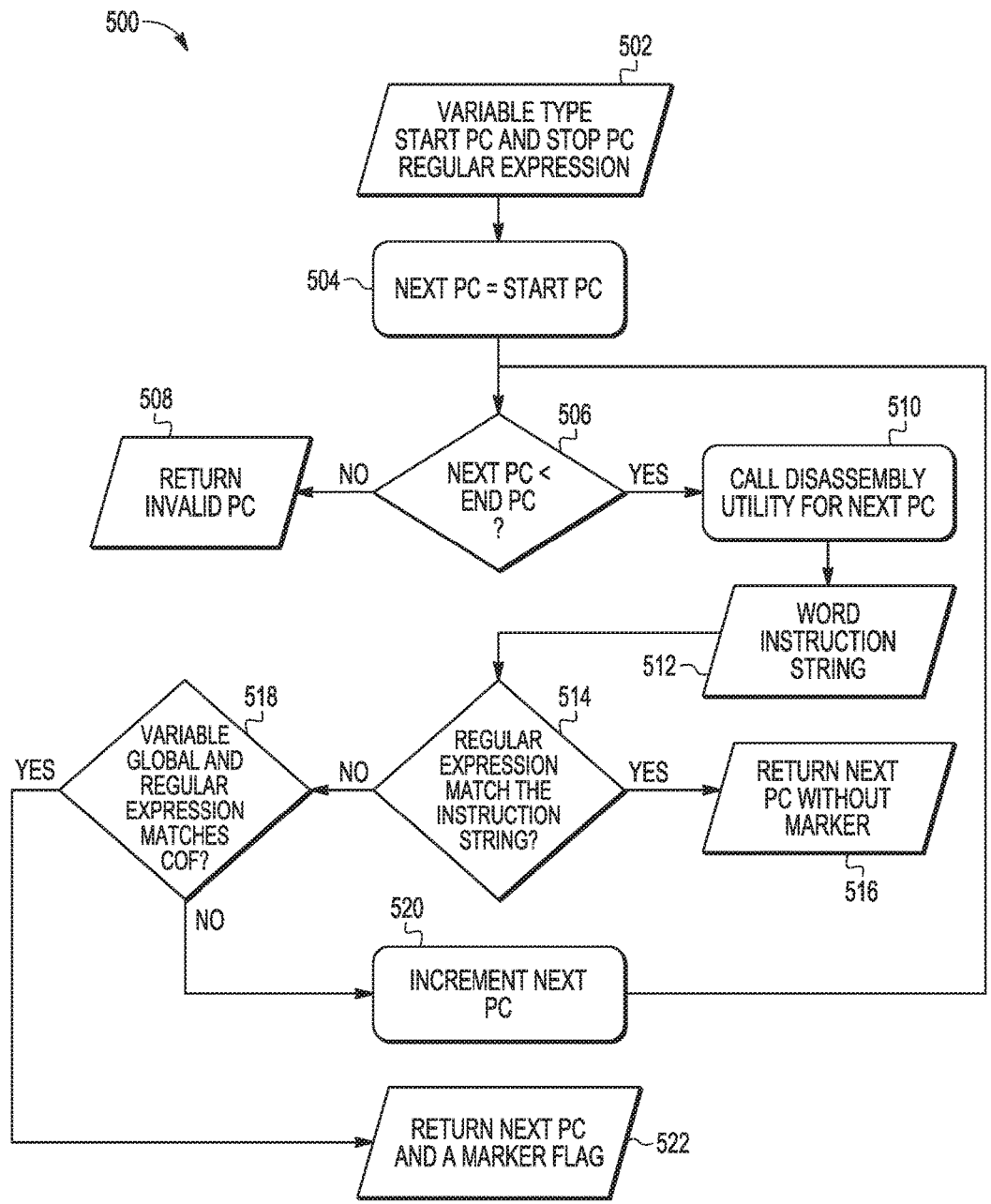
FIG. 5 illustrates a simplified flow chart showing the logic for performing a pattern search in disassembly information in accordance selected embodiments of the present disclosure.

To provide additional details for an improved understanding of selected embodiments of the pattern search step 404, reference is now made to FIG. 5 which depicts a simplified flow chart 500 showing the logic for performing a pattern search in disassembly information in accordance selected embodiments of the present disclosure. In the depicted methodology 500, the received pattern search input term (block 502) is applied to iteratively search the disassembly information, starting with the start PC machine address and continuing until the end or stop PC machine address.

In the depicted example, the pattern search process begins at step 504 by initializing the PC address with the Start PC machine address contained in the received pattern search input term (block 502). For each PC machine address in this interval before the end of the interval is reached (e.g., affirmative outcome to end detection step 506), the debug process performs a first step to call the disassembly information and get the word instruction string for the current program address (e.g., Next PC). After retrieving the word instruction string (block 512), the debug process performs a second step (at step 514) to determine whether the input "regular expression" string from the pattern search input term (block 502) matches the word instruction string 512. If there is a match (affirmative outcome to step 514), then the debug process returns current PC machine address without a marker flag (at step 516). However, if there is no match (negative outcome to step 514), then the debug process determines if the variable is a local variable or a global variable (at step 518).

If the pattern search process determines that the variable is a global variable with a regular expression that matches a specified change of flow (COF) pattern (affirmative outcome of step 518), then the current program address (e.g., Next PC) and a marker flag are returned (at step 522). This marker flag will tell the debugger that the breakpoint that will be inserted at this PC is internal and should not be visible to the user. However, if the pattern search process determines that the variable is a local variable or a global variable that has not reached a specified change of flow (negative outcome of step 518), then the PC machine address (Next PC) is incremented (at step 520), and the process returns to end detection step 506 to determine if the end of the interval is reached. In this way, the processing at steps 510, 512, 514, 516, 518 is iteratively repeated until the end of the search area interval is reached (negative outcome to step 506), at which point an invalid value for the machine address (e.g., −1) is returned at step 508.

Referring back to the watchpoint installation step 420 shown in FIG. 4, the results of the pattern search process are provided in the form of a PC machine address and marker flag (block 406). If the debug process determines that the returned PC machine address is valid (affirmative outcome to detection step 408), then the debugger will set or insert a software program breakpoint at that machine address (step 410). The location where the breakpoint is inserted is the PC machine address location output from the pattern search (step 404) which corresponds to the instructions found during the search. In the example provided above where the search utility (e.g., objdump) returns the address of the instruction, the debugger inserts the breakpoint by changing the program memory bits to insert a core specific instruction (e.g., on ARM is a special instruction BKPT). And if the marker flag is set, the debugger will internally associate this flag to the breakpoint. This flag will be set if the breakpoint is installed on a COF instruction, and will tell the debugger that the user should not be aware of this breakpoint so that it serves a temporary breakpoint in the watchpoint algorithm 420. On the other hand, if the debug process determines that the returned PC machine address is invalid (negative outcome to detection step 408), then the debugger will not set any breakpoints (step 402) and will inform the user that the watchpoint could not be set.

Figure 6:
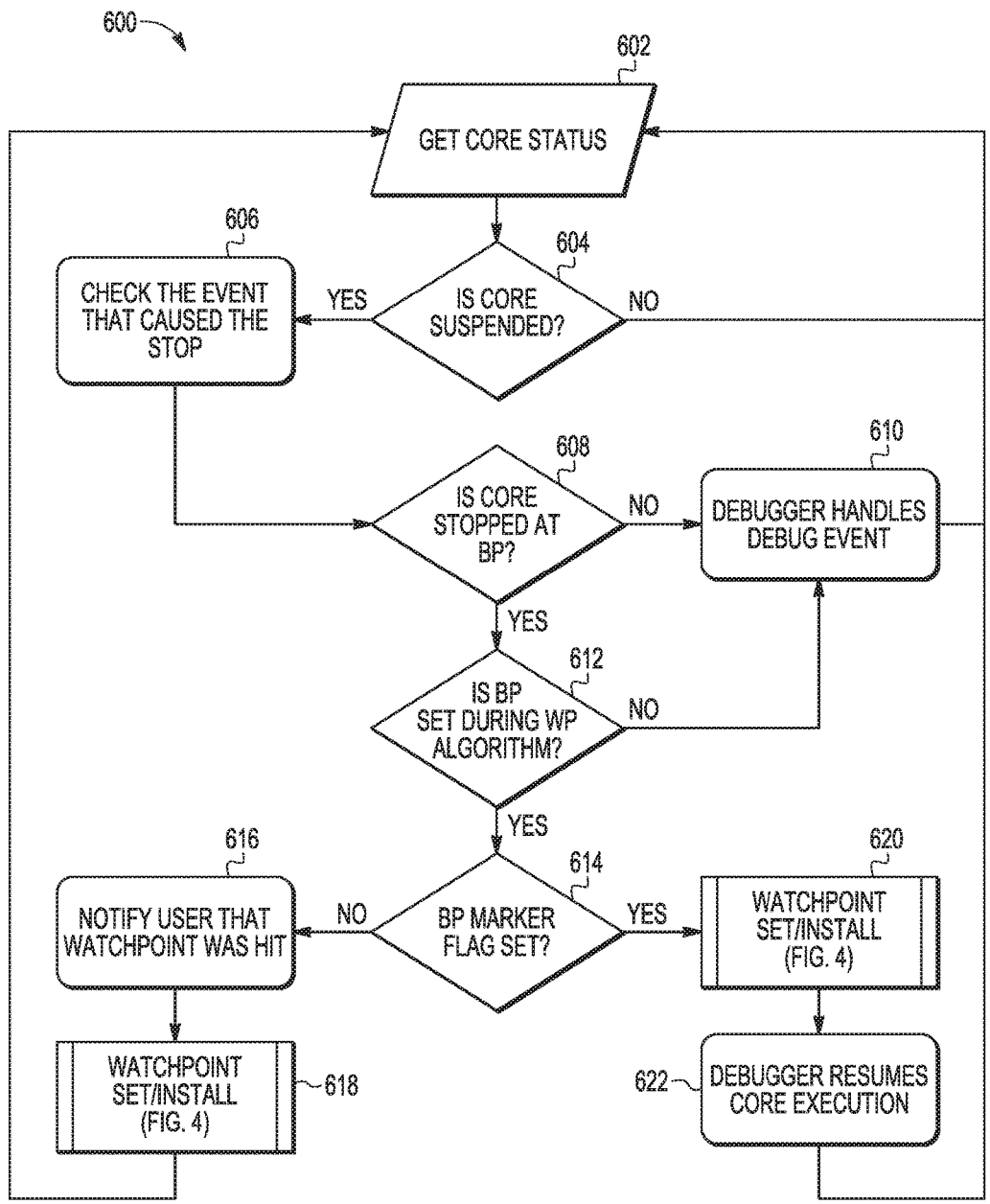
FIG. 6 illustrates a simplified flow chart showing the logic for core state polling and debug handling in accordance selected embodiments of the present disclosure.

Once the watchpoints are set or installed at step 420, a separate debug process is used to periodically check on the state of the core and process address debug events (at step 414). To provide additional details for an improved understanding of selected embodiments of the core state polling step 414, reference is now made to FIG. 6 which depicts a simplified flow chart 600 showing the logic for performing core state polling and debug handling in accordance selected embodiments of the present disclosure. In the depicted methodology 600, the core status is checked periodically or on a predetermined polling interval (step 602) that is selected so that the user can obtain an accurate picture of the application and processor state. At step 604, the polling process checks to see if the core is suspended or not. If the core is not suspended (negative outcome to detection step 604), then the process returns to step 602 and the core status polling process continues. However, if the core is suspended (affirmative outcome to detection step 604), then the polling process updates the user with information (e.g., register values, memory content, the event responsible for the core to stop). To this end, the polling process checks for the root cause of the stop, starting with detection step 608 which determines if the core is stopped at one of the installed software breakpoints.

If the core is not stopped at a software breakpoint (negative outcome to detection step 608), then debugger will handle the debug event (step 610) with a process that will update user with the status of the core resources invoked by the debug event. However, if the core is stopped at a software breakpoint (affirmative outcome to detection step 608) and this breakpoint is the one set during the watchpoint installation step (e.g., step 420), then the debugger will check the marker flag to see if it is set (step 614).

If the breakpoint marker flag is not set (negative outcome to detection step 614), then the control stopped at a reference of the variable and the debugger will show this information to the user (step 616) before calling the watchpoint installation process (step 618). However, if the breakpoint marker flag is set (affirmative outcome to detection step 614), then the control stopped at the change of flow. This is a signal for the debugger to call the watchpoint installation process (step 620) and resume core execution (step 622) to continue with the next iteration in the pattern search from the current program count value until the end of the variable address range (determined at the beginning of the algorithm) and then resume the execution of the core and not inform to the user of this stop.

To overcome limitations of conventional debugging approaches where a watchpoint for a variable or expression is moved to a CPU register during compiler optimization, there is disclosed herein an external debugger module for testing and debugging a computer software program by using only ELF standard debug information to install software watchpoints for variables/expressions that are stored in CPU registers or memory so that a core can be stopped and placed in a debug mode when a software watchpoint is hit so that requested data is read through a debug probe. Embodiments find application for instance, in semiconductor systems development tools, which are intended to embedded software development, configuration, test and debugging.

The described innovation thus proposes an efficient software-based solution for addressing the use-case where watchpoints for variable/expressions are moved into a CPU register as a result of compiler optimization processes without requiring special hardware support within the processor or additional compiler-generated information about the variable/expression. Further advantages of the disclosed innovation over conventional solutions include allowing software watchpoints to be set for variables that are stored in registers; enabling the installation of software watchpoints during runtime with dedicated debugger support which uses only standard runtime disassembly information so that no other software or hardware components are needed; overcoming the limitation on the number of possible combinations of watchpoints that can be installed due to hardware limitations of using dedicated watchpoint registers; and eliminating the need for dedicated hardware support for watchpoint handling during debug operations.

As disclosed herein, the software watchpoint apparatus may be embodied in a computer program product for running on a computer system processor which includes program code portions for performing steps of a method when run on a programmable apparatus, such as a computer system or enabling a programmable apparatus, to perform functions of a device or system for installing software watchpoints for variables or expressions using only dedicated debugger support. As used herein, a "processor" refers to any microprocessor (MPU), microcontroller (MCU), digital signal processor (DSP), a digital signal controller (DSC), or System-on-Chip (SoC) for running a computer software program. Although embodiments are described in the context of debugging of an application program run by the processor core, the proposed debugging module may be implemented in a wide range of applications. In addition, an "operating system" refers to the software that manages the sharing of the resources of a computer and provides programmers with an interface used to access those resources. An operating system processes system data and user input, and responds by allocating and managing tasks and internal system resources as a service to users and programs of the system In addition, a "program" refers to a sequence of instructions designed for execution on a computer system, and may include a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a DVD, flash drive, CD-ROM or diskette, stored with data loadable in a memory of a computer system, the data representing the computer program. The data carrier may further be a data connection, such as a telephone line, cable or other wired or wireless connection. In addition or in the alternative, all or some of the software described herein may be stored on or retrieved from computer readable media, such as memory or other storage media which may be permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Some of the above embodiments, as applicable, may be implemented using a variety of different information processing systems. For example, although FIG. 1 and the discussion thereof describe an exemplary data processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architecture depicted herein is merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality. Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

By now it should be appreciated that there has been provided an apparatus, method, program code, and system for debugging a compiled computer program having one or more variables. In the disclosed embodiments, variable location information for a first variable stored in a CPU register is generated using only debug information and standard runtime disassembly information for the compiled computer program. In selected embodiments, the variable location information is generated by parsing debug information provided in DWARF debugging data format to identify a variable type, address range, and variable location information for the first variable. In addition, a search pattern for the first variable is generated based on the variable location information. In selected embodiments, the search pattern is generated by creating a regular expression for the first variable which comprises a register name for the CPU register where the first variable is stored. In addition, the search pattern is used to search the runtime disassembly information to identify a program address for the first variable. In selected embodiments, the runtime disassembly information is searched between the address range to identify the program address as a machine address for a word instruction which matches the regular expression, and then the program address is returned without a marker flag being set. In other embodiments where the first variable is a local variable, the runtime disassembly information is searched between the address range to identify the program address as a machine address for a word instruction which does not match the regular expression, and then the program address is incremented. In other embodiments where the first variable is a global variable, the runtime disassembly information is searched between the address range to identify the program address as a machine address for a change of flow pattern which matches the regular expression, and then the program address is returned with a marker flag being set. In addition, a software program watchpoint is set for the first variable at the program address. In selected embodiments, the watchpoint is set by installing a software program breakpoint at the program address, and internally associating the marker flag to the software program breakpoint. Finally, the software program watchpoint for the first variable is handled or processed during a debugging phase of the program as specified by a user.

In another form, there is provided a debug apparatus and associated method of operation having one or more debug registers and a processor configured and connected to execute debug tool instructions stored in a memory for debugging a compiled computer program comprising one or more variables. As disclosed herein, the debug tool instructions include a parsing module which is configured to generate variable location information for a first variable stored in a CPU register using debug information and runtime disassembly information for the compiled computer program. In selected embodiments, the variable location information is generated by parsing debug information provided in DWARF debugging data format to identify a variable type, address range, and variable location information for the first variable. In addition, the debug tool instructions may include a pattern search module is configured to generate a search pattern for the first variable based on the variable location information and to search the runtime disassembly information for the search pattern to identify a first program address for the first variable. In selected embodiments, the pattern search module generates the search pattern by creating a regular expression for the first variable which comprises a register name for the CPU register where the first variable is stored. In selected embodiments, the pattern search module searches the runtime disassembly information by searching in the runtime disassembly information between the address range to identify the first program address as a machine address for a word instruction which matches the regular expression, and then returning the first program address without a marker flag being set. Finally, debug tool instructions may also include a watchpoint install module that is configured to set a software program watchpoint for the first variable at the first program address. The debug tool instructions may also include instructions for handling the software program watchpoint for the first variable during a debugging phase of the program as specified by a user.

In yet another form, there is provided a software watchpoint apparatus which includes a processor having one or more CPU registers which executes an instruction set which includes debug instructions for debugging a compiled computer program having one or more variables. As disclosed, the software watchpoint apparatus includes a first software reader utility for identifying variable location information for a first variable stored in a first CPU register using debug information and runtime disassembly information for the compiled computer program. In selected embodiments, the first software reader utility identifies variable location information by parsing debug information provided in DWARF debugging data format to identify a variable type, address range, and variable location information for the first variable. The software watchpoint apparatus also includes a second software reader utility for searching the runtime assembly information using a search pattern for the first variable that is generated based on the variable location information to identify a first program address for the first variable. In selected embodiments, the software watchpoint apparatus generates the search pattern by creating a regular expression for the first variable which comprises a register name for the CPU register where the first variable is stored. In addition, the second software reader utility may be configured to search the runtime disassembly information by searching the runtime disassembly information between the address range to identify the first program address as a machine address for a word instruction which matches the regular expression, and then returning the first program address without a marker flag being set. In selected embodiments, the first software reader utility and second software reader utility may be embodied as a shared utility for accessing both the debug information and the runtime disassembly information. Finally, the software watchpoint apparatus includes a watchpoint setting module for setting a software program watchpoint for the first variable at the first program address. In addition, the debug instructions may include instructions for handling the software program watchpoint for the first variable during a debugging phase of the program as specified by a user.

Although the described exemplary embodiments disclosed herein are directed to software-based methods and systems for efficiently installing watchpoints for user-specified variables, the present invention is not necessarily limited to the example embodiments illustrate herein, and various embodiments of the circuitry and methods disclosed herein may be implemented with other devices and software components. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Various illustrative embodiments of the present invention have been described in detail with reference to the accompanying figures. While various details are set forth in the foregoing description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for debugging a compiled computer program comprising one or more variables, the method comprising:
   generating variable location information for a first variable stored in a CPU register using debug information and runtime disassembly information for the compiled computer program, wherein the first variable comprises a global variable;
   generating a search pattern for the first variable based on the variable location information, wherein
      the search pattern comprises an address range for the first variable, and
      said generating the search pattern comprises creating a regular expression for the first variable;
   searching the runtime disassembly information for the search pattern to identify a first program address for the first variable, wherein said searching the runtime disassembly information comprises
      searching the runtime disassembly information between the address range to identify the first program address as a machine address for a change of flow pattern that matches the regular expression, and
      returning the first program address with a marker flag being set; and
   setting a software program watchpoint for the first variable at the first program address.

2. The method of claim 1, further comprising handling the software program watchpoint for the first variable during a debugging phase of the program as specified by a user.

3. The method of claim 1, where generating variable location information comprises parsing debug information provided in DWARF debugging data format to identify a variable type, the address range, and variable location information for the first variable.

4. The method of claim 3, where the regular expression for the first variable comprises a register name for the CPU register where the first variable is stored.

5. The method of claim 4, where searching the runtime disassembly information comprises:
   searching the runtime disassembly information between the address range to identify the first program address as a machine address for a word instruction which matches the regular expression; and
   returning the first program address without a marker flag being set.

6. The method of claim 1, where setting the software program watchpoint for the first variable at the first program address comprises:
   installing a software program breakpoint at the first program address; and internally associating the marker flag to the software program breakpoint.

7. The method of claim 1, further comprising:
generating second variable location information for a second variable stored in memory using debug information and runtime disassembly information for the compiled computer program;
generating a second search pattern for the second variable based on the second variable location information;
searching the runtime disassembly information for the second search pattern to identify a second program address for the second variable; and
setting a software program watchpoint for the second variable at the program address.

8. A debug apparatus, comprising one or more debug registers and a debug controller configured and connected to execute debug tool instructions stored in a memory for debugging a compiled computer program comprising one or more variables, the debug tool instructions comprising:
a parsing module for generating variable location information for a first variable stored in a CPU register using debug information and runtime disassembly information for the compiled computer program, wherein the variable location information comprises an address range for the first variable;
a pattern search module for generating a search pattern for the first variable based on the variable location information and for searching the runtime disassembly information for the search pattern to identify a first program address for the first variable, wherein
the pattern search module generates the search pattern by creating a regular expression for the first variable,
the pattern search module performs said searching the disassembly information by searching the runtime disassembly information between the address range to identify the first program address as a machine address for a word instruction which matches the regular expression and returning the first program address without a marker flag being set; and
a watchpoint install module for setting a software program watchpoint for the first variable at the first program address.

9. The debug apparatus of claim 8, where the debug tool instructions further comprise instructions for handling the software program watchpoint for the first variable during a debugging phase as specified by a user.

10. The debug apparatus of claim 8, where the parsing module generates variable location information by parsing debug information provided in DWARF debugging data format to identify a variable type, the address range, and variable location information for the first variable.

11. The debug apparatus of claim 10, where the regular expression for the first variable comprises a register name for the CPU register where the first variable is stored.

12. A software watchpoint apparatus comprising a processor comprising one or more CPU registers which executes an instruction set comprising debug instructions for debugging a compiled computer program comprising one or more variables, the software watchpoint apparatus comprising:
a first software reader utility for identifying variable location information for a first variable stored in a first CPU register using debug information and runtime disassembly information for the compiled computer program, wherein the variable location information comprises an address range for the first variable;
a second software reader utility for searching the runtime assembly information using a search pattern for the first variable that is generated based on the variable location information to identify a first program address for the first variable, wherein
the software watchpoint apparatus generates the search pattern by creating a regular expression for the first variable, and
the second software reader utility searches the runtime disassembly information by searching the runtime disassembly information between the address range to identify the first program address as a machine address for a word instruction which matches the regular expression and returning the first program address without a marker flag being set; and
a watchpoint setting module for setting a software program watchpoint for the first variable at the first program address.

13. The software watchpoint apparatus of claim 12, where the debug instructions further comprise instructions for handling the software program watchpoint for the first variable during a debugging phase of the program as specified by a user.

14. The software watchpoint apparatus of claim 12, where the first software reader utility identifies variable location information by parsing debug information provided in DWARF debugging data format to identify a variable type, the address range, and variable location information for the first variable.

15. The software watchpoint apparatus of claim 14, where the regular expression for the first variable comprises a register name for the CPU register where the first variable is stored.

16. The software watchpoint apparatus of claim 12, where the first software reader utility and second software reader utility comprise a shared utility for accessing both the debug information and the runtime disassembly information.

* * * * *